United States Patent
Aihara et al.

[11] Patent Number: 5,901,988
[45] Date of Patent: May 11, 1999

[54] STRUCTURE FOR COUPLING PIPE WITH BREECHES PIPE

[75] Inventors: Hiroyuki Aihara, Kanagawa; Eizo Suyama, Tokyo, both of Japan

[73] Assignee: Calsonic Corporation, Tokyo, Japan

[21] Appl. No.: 08/845,147

[22] Filed: Apr. 21, 1997

[30] Foreign Application Priority Data

Apr. 30, 1996 [JP] Japan ................................ 8-109593

[51] Int. Cl.$^6$ ................................................ B21C 37/29
[52] U.S. Cl. ................................. 285/288.1; 285/131.1; 29/890.08; 138/115; 138/177
[58] Field of Search ............................ 24/428, 890.08; 285/131.1, 132.1, 125.1, 288.1, 288.2, FOR 163; 228/165, 174; 138/115–117, 177

[56] References Cited

U.S. PATENT DOCUMENTS

| | | | |
|---|---|---|---|
| 1,293,871 | 2/1919 | Murray | 285/288.2 |
| 1,904,967 | 4/1933 | Barder | 29/428 X |
| 3,204,723 | 9/1965 | Sunday | 29/890.08 X |
| 3,336,056 | 8/1967 | Cassel et al. | 138/115 X |
| 5,170,557 | 12/1992 | Rigsby | 29/890.08 |

FOREIGN PATENT DOCUMENTS

| | | |
|---|---|---|
| 57-47523 | 3/1982 | Japan . |
| 215452 | 5/1924 | United Kingdom .......... 285/FOR 163 |
| 242094 | 11/1925 | United Kingdom .......... 285/FOR 163 |
| 337463 | 11/1930 | United Kingdom .......... 285/FOR 163 |
| 2 127 328 | 9/1982 | United Kingdom . |

OTHER PUBLICATIONS

Alden et al. Design of Industrial Exhaust Systems. 4 ed. (New York: Industrial Press). pp. 97, 98, 1970.

*Primary Examiner*—Anthony Knight
*Assistant Examiner*—Greg Binda
*Attorney, Agent, or Firm*—Foley & Lardner

[57] ABSTRACT

A coupling structure between a cylindrically united end portion of a breeches pipe and a cylindrical end portion of a tubular pipe. The cylindrically united end portion has at diametrically opposed portions thereof respective grooves each extending axially from a circular end of the cylindrically united end portion. The cylindrical end portion of the tubular pipe has at diametrically opposed portions thereof respective slots each extending axially from a circular end of the cylindrical end portion. The cylindrically united end portion of the breeches pipe is inserted into the cylindrical end portion of the tubular pipe in such a manner that grooves are mated and merged with the slots respectively. The circular end of the tubular pipe is entirely welded to an outer surface of the cylindrically united end portion of the breeches pipe and a periphery of each slot is entirely welded to the corresponding groove to achieve a hermetic sealing therebetween.

7 Claims, 4 Drawing Sheets

STRUCTURE FOR COUPLING PIPE WITH BREECHES PIPE

BACKGROUND OF THE INVENTION

1. Field of the Invention

The present invention relates in general to a structure for coupling pipes, and more particularly to a structure for coupling a tubular pipe with a breeches pipe, which is used in an exhaust manifold of an automotive internal combustion engine. More specifically, the present invention is concerned with a structure for coupling, via welding, a cylindrically united end portion of the breeches pipe with one cylindrical end portion of the tubular pipe.

2. Description of the Prior Art

In an exhaust system of an automotive internal combustion engine, there is provided an exhaust manifold which carries waste emissions away from the combustion chambers of the engine. Some of the exhaust manifolds are of a type which comprises a plurality of tubular pipes each of which has one end connected to an exhaust pipe of the exhaust system and corresponding number of breeches pipes each of which has a cylindrically united end portion coupled, via welding, with the other end of each tubular pipe and separated two ends respectively connected to exhaust ports of the engine.

Some structures for coupling, via welding, the united end of a breeches pipe with a tubular pipe are described in Laid-open Patent Application 57-47523, which are schematically shown in FIGS. 4, 5, 6 and 7 of the accompanying drawings.

As is shown in FIG. 4, in one conventional coupling structure, a cylindrically united end of a breeches pipe 11 is connected via welding "W" to one end of a tubular pipe 13.

FIGS. 5A, 5B and 5C show the method of producing the breeches pipe 11. As shown in FIG. 5A, for the production, a straight tubular pipe 15 is used, which has a flat portion 15a formed on a cylindrical wall thereof. Thus, the cross section of the pipe 15 at the flat portion 15a is shaped to have a straight part 15b and an arcuate part 15c, as shown. Then, as is shown in FIG. 5B, the pipe 15 is cut at only the semi-cylindrical wall 15c except the flat portion 15a, and then, as is shown in FIG. 5C, the pipe 15 is folded largely in two along the cut portion.

However, in the structure of FIG. 4, the coupling between the breeches pipe 11 and the tubular pipe 13 is somewhat weak because of inherency of such coupling structure. That is, as shown, the two members 11 and 13 are mated in a so-called end-to-end connecting manner and welding "W" is applied to only the mated end portions, which fails to allow the coupling therebetween to exhibit a satisfied unifying force.

In order to solve the above-mentioned drawback, one measure has been thought out which is shown in FIG. 6. That is, in this measure, the cylindrically united end portion 11a of a breeches pipe 11 is snugly inserted in one end of a tubular pipe 17, and welding "W" is applied to a portion where a leading end of the pipe 17 is mated with the cylindrical wall of the united end portion 11a of the breeches pipe 11.

However, even this coupling structure has a drawback which is depicted by FIG. 7. That is, as shown, due to inherency of such coupling structure, there are remained certain gaps "S" between the inserted united end portion 11a of the breeches pipe 11 and the tubular pipe 17, each axially extending along the mated edges of the folded two parts of the pipe 11. In fact, such gaps "S" originate from grooves which are inevitably produced when the straight tubular pipe 15 (see FIGS. 5A, 5B and 5C) is folded into two. Such gaps "S" however bring about a higher possibility of leakage of exhaust gas to the open air therethrough. Even though such leakage can be minimized by covering the spaces "S" with welding "W", complete suppression of leakage is not achieved because welding "W" can not be applied to the entire length "L" of the united end portion 11a of the breeches pipe 11 which is received in the tubular pipe 17.

SUMMARY OF THE INVENTION

It is therefore an object of the present invention to provide a coupling structure for coupling, via welding, a cylindrically united end portion of a breeches pipe with one cylindrical end portion of a tubular pipe, which is free of the above-mentioned drawbacks.

According to a first aspect of the present invention, there is provided a coupling structure which comprises a breeches pipe having a cylindrically united end portion, the cylindrically united end portion having at diametrically opposed portions thereof respective grooves each extending axially from a circular end of the cylindrically united end portion; a tubular pipe having one cylindrical end portion which has at diametrically opposed portions thereof respective slots each extending axially from a circular end of the cylindrical end portion, the cylindrically united end portion of the breeches pipe being inserted into the cylindrical end portion of the tubular pipe in such a manner that the grooves are mated and merged with the slots respectively, each slot having an axially leading end in the vicinity of the circular end of the cylindrically united end portion; first means for entirely welding the circular end of the tubular pipe to an outer surface of the cylindrically united end portion of the breeches pipe to achieve a hermetic sealing therebetween; and second means for entirely welding a periphery of each slot to that of the corresponding groove in a manner to achieve a hermetic sealing therebetween.

According to a second aspect of the present invention, there is provided an exhaust manifold for an internal combustion engine, which comprises a breeches pipe of stainless steel, the breeches pipe having a cylindrically united end portion and two separated end which are adapted to connect to exhaust ports of the engine, the cylindrically united end portion having at diametrically opposed portions thereof respective grooves each extending axially from a circular end of the cylindrically united end portion; a tubular pipe of stainless steel having one cylindrical end portion and the other end portion which is adapted to connect to an exhaust pipe, the cylindrical end portion having at diametrically opposed portions thereof respective slots each extending axially from a circular end of the cylindrical end portion, the cylindrically united end portion of the breeches pipe being inserted into the cylindrical end portion of the tubular pipe in such a manner that the grooves are mated and merged with the slots respectively, each slot having an axially leading end in the vicinity of the circular end of the cylindrically united end portion; first means for entirely welding the circular end of the tubular pipe to an outer surface of the cylindrically united end portion of the breeches pipe to achieve a hermetic sealing therebetween; and second means for entirely welding a periphery of each slot to that of the corresponding groove in a manner to achieve a hermetic sealing therebetween.

According to a third aspect of the present invention, there is provided a method for coupling a cylindrically united end portion of a breeches pipe with a cylindrical end portion of a tubular pipe, the cylindrically united end portion having at diametrically opposed portions thereof respective grooves each extending axially from a circular end of the cylindrically united end portion. The method comprises the steps of (a) providing diametrically opposed portions of the cylindrical end portion of the tubular pipe with respective slots each extending axially from a circular end of the cylindrical end portion; (b) inserting the cylindrically united end portion of the breeches pipe into the cylindrical end portion of the tubular pipe in such a manner that the grooves are mated and merged with the slots respectively and by such a degree that an axially leading end of each slot of the tubular pipe is placed in the vicinity of the circular end of the cylindrically united end portion; (c) welding entirely the circular end of the tubular pipe to an outer surface of the cylindrically united end portion of the breeches pipe in a manner to achieve a hermetic sealing therebetween; and (d) welding entirely a periphery of each slot to that of the corresponding groove in a manner to achieve a hermetic sealing therebetween.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
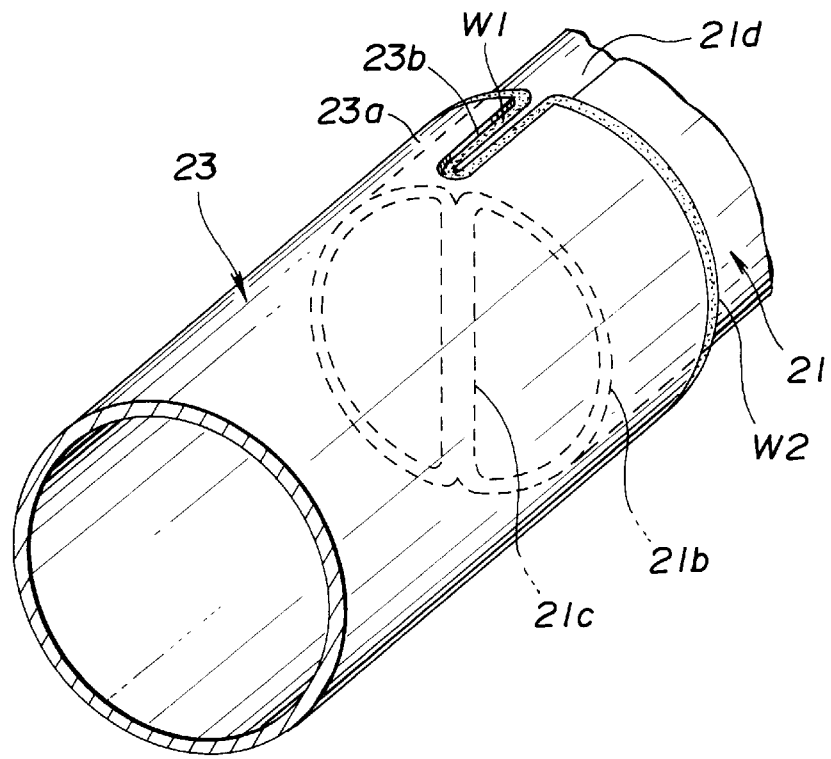
FIG. 1 is a perspective view of a coupling structure according to the present invention, showing a condition wherein a cylindrically united end portion of a breeches pipe is tightly received in and welded to on cylindrical end portion of a tubular pipe.
Figure 2:
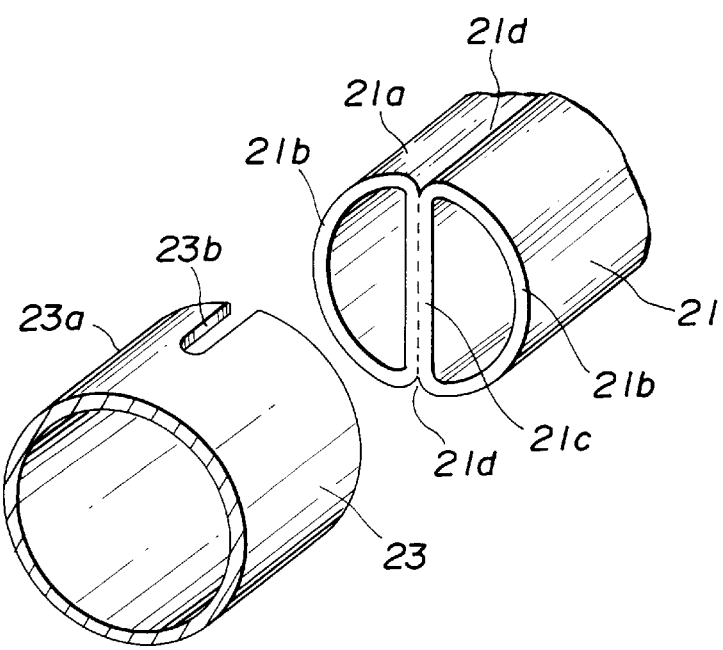
FIG. 2 is an exploded perspective view of the coupling structure of the invention.

Referring to FIGS. 1 and 2, there is shown a coupling structure for coupling, via welding, a cylindrically united end portion 21a of a breeches pipe 21 with one cylindrical end portion 23a of a tubular pipe 23, which is the present invention. These pipes 21 and 23 are constructed of heat resisting metal such as stainless steel or the like.

As is seen from FIG. 2, for the above-mentioned reason, the cylindrically united end portion 21a of the breeches pipe 21 has at diametrically opposed portions respective grooves 21d, each extending along the mated edges of the folded two parts of the pipe 21. As shown, the mouth opening of the cylindrically united end portion 21a includes two semicircular openings, each being defined by one arcuate wall part 21b of the pipe 21 and a common flat wall part 21c of same.

As is seen from FIG. 2, the cylindrical end portion 23a of the tubular pipe 23 has at diametrically opposed portions respective slots 23b (only one is shown) each extending axially from the leading end of the pipe 23.

As is understood from FIG. 1, when the cylindrically united end portion 21a of the breeches pipe 21 is properly inserted into the cylindrical end portion 23a of the tubular pipe 23, each slot 23b is mated and merged with the corresponding groove 21d of the united end portion 21a of the breeches pipe 21. Under this condition, an axially leading end of each slot 23b is placed in the vicinity of the circular end of the cylindrically united end portion 21a of the breeches pipe 21, as shown.

In accordance with the present invention, welding is applied entirely to both a first area "W1" and a second area "W2". That is, at the first area "W1", the periphery of each slot 23b is entirely welded to that of the corresponding groove 21d in a manner to achieve a hermetic sealing therebetween, and at the second area "W2", the circular end of the tubular pipe 23 is entirely welded to the cylindrical outer wall of the cylindrically united end portion 21a in a manner to achieve a hermetic sealing therebetween. Application of welding to both the first and second areas "W1" and "W2" is continuously carried out to obtain a desired welding seam therebetween.

Figure 3:
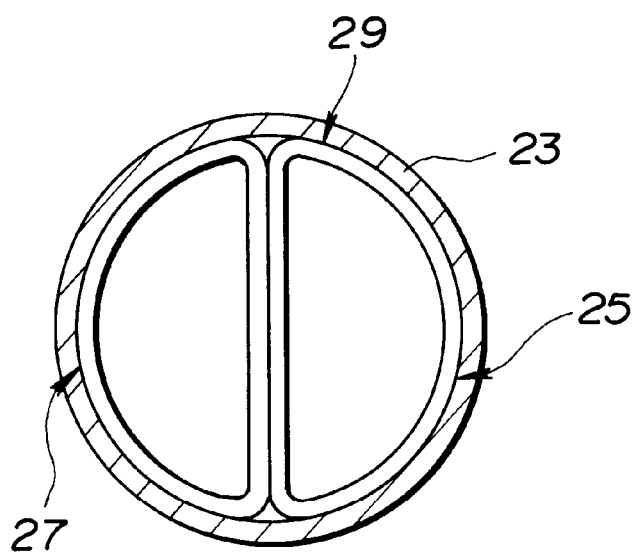
FIG. 3 is a laterally sectional view of a modified coupling structure of tile present invention, which is applied to a different breeches pipe.
Figure 4:
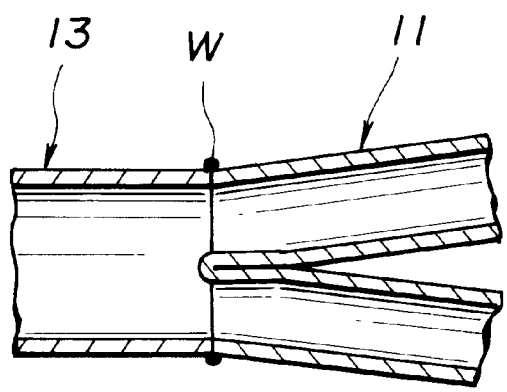
FIG. 4 is a longitudinally sectional view of one conventional coupling structure.
Figure 5A:
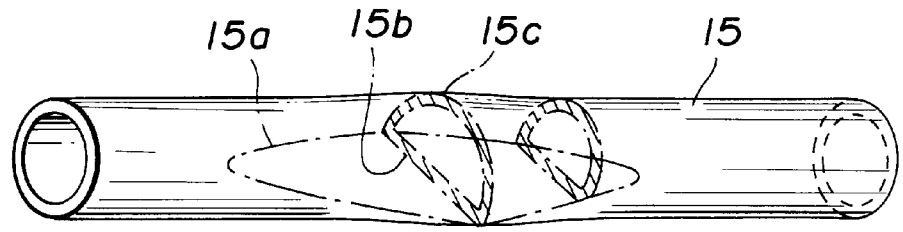
FIGS. 5A, 5B and 5C are views showing the steps for producing a breeches pipe from a straight tubular pipe.
Figure 5B:
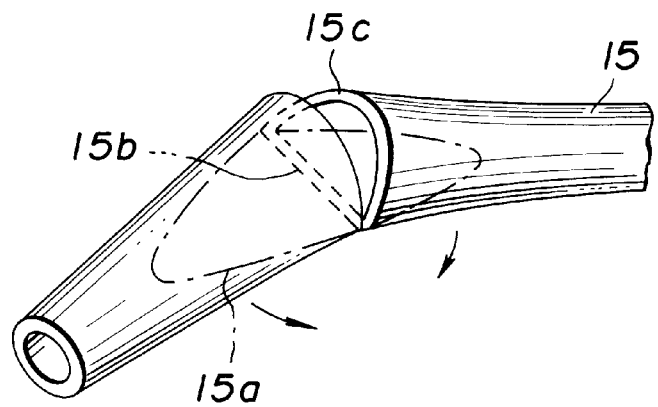
Figure 5C:
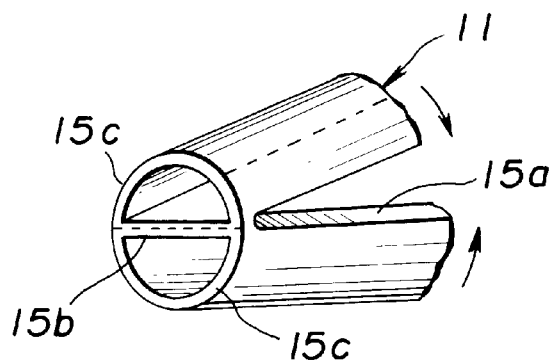

If desired, the coupling structure of the invention may be applied to a different breeches pipe 29 as shown in FIG. 3. The breeches pipe 29 comprises two pipes 25 and 27 whose one ends are united to constitute an end portion like the above-mentioned cylindrically united end portion 21a of the breeches pipe 21.

In the following, advantages possessed by the coupling structure of the invention will be described.

First, because the coupling between the breeches pipe 21 and the tubular pipe 23 is made in the above-mentioned manner, a hermetic sealing is assuredly achieved therebetween. Due to provision of the slots 23b in the tubular pipe 23, application of welding to the grooves 21d of the breeches pipe 21 for the hermetic sealing at the grooves 21d is easily carried out.

Second, since the portion to which welding "W1" is practically applied increases in length due to provision of the slots 23b, the coupling between the two pipes 21 and 23 is much assured. Furthermore, because of the same reason, the mechanical strength of the coupling structure is increased.

Figure 6:
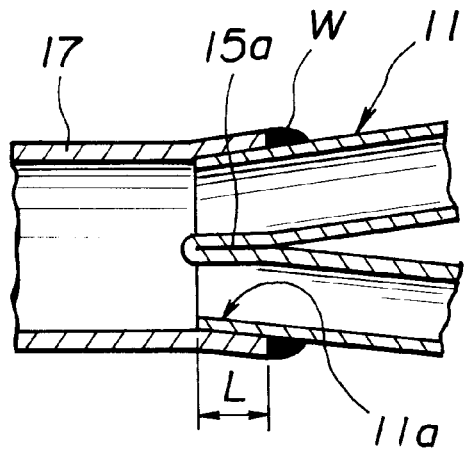
FIG. 6 is a view similar to FIG. 4, but showing another conventional coupling structure.
Figure 7:
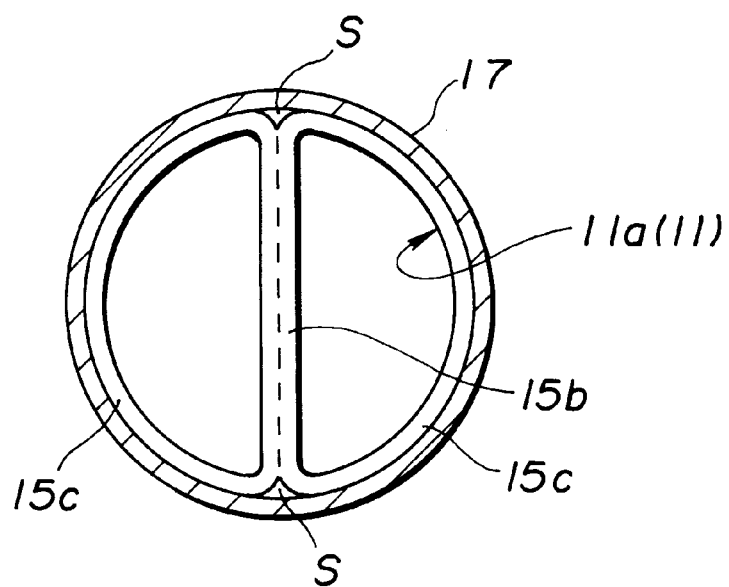
FIG. 7 is a laterally sectional view of the coupling structure of FIG. 6.

Third, the coupling structure of the invention is readily provided by making a slight modification to the conventional coupling structure of FIG. 6. That is, providing the tubular pipe 23 with slots 23b is only needed.

The present invention is not limited to the above-mentioned coupling structures described and represented hereinbefore and various modifications can be made thereto without passing beyond the scope of the invention.

What is claimed is:

1. A coupling structure comprising:
   a breeches pipe having a cylindrically united end portion, said cylindrically united end portion having at diametrically opposed portions thereof respective grooves each extending axially from a circular end of said cylindrically united end portion;
   a tubular pipe having one cylindrical end portion which has at diametrically opposed portions thereof respective slots each extending axially from a circular end of said cylindrical end portion, said cylindrically united end portion of said breeches pipe being inserted into the cylindrical end portion of said tubular pipe in such a manner that said grooves are mated and merged with said slots respectively, each slot having an axially leading end in the vicinity of said circular end of said cylindrically united end portion;

first means for entirely welding said circular end of said tubular pipe to an outer surface of the cylindrically united end portion of said breeches pipe to achieve a hermetic sealing therebetween; and second means for entirely welding a periphery of each slot to that of the corresponding groove in a manner to achieve a hermetic sealing therebetween.

2. A coupling structure as claimed in claim 1, in which said breeches pipe is a metal pipe produced by folding a straight tubular pipe in two.

3. A coupling structure as claimed in claim 2, in which said breeches pipe is produced by taking the following steps:

(a) forming a flat area on a cylindrical wall of said straight tubular pipe to constitute a semi-cylindrical part of said straight tubular pipe;

(b) providing a cut in said semi-cylindrical part except said flat area; and (c) folding said straight tubular pipe in two at said semi-cylindrical part in a manner to open said cut.

4. A coupling structure as claimed in claim 1, in which each of said breeches pipe and said tubular pipe is constructed of stainless steel.

5. An exhaust manifold for an internal combustion engine, comprising:

a breeches pipe of stainless steel, said breeches pipe having a cylindrically united end portion and two separated ends which are adapted to connect to exhaust ports of the engine, said cylindrically united end portion having at diametrically opposed portions thereof respective grooves each extending axially from a circular end of said cylindrically united end portion;

a tubular pipe of stainless steel having one cylindrical end portion and the other end portion which is adapted to connect to an exhaust pipe, said cylindrical end portion having at diametrically opposed portions thereof respective slots each extending axially from a circular end of said cylindrical end portion, said cylindrically united end portion of said breeches pipe being inserted into the cylindrical end portion of said tubular pipe in such a manner that said grooves are mated and merged with said slots respectively, each slot having an axially leading end in the vicinity of said circular end of said cylindrically united end portion;

first means for entirely welding said circular end of said tubular pipe to an outer surface of the cylindrically united end portion of said breeches pipe to achieve a hermetic sealing therebetween; and second means for entirely welding a periphery of each slot to that of the corresponding groove in a manner to achieve a hermetic sealing therebetween.

6. A method for coupling a cylindrically united end portion of a breeches pipe with a cylindrical end portion of a tubular pipe, said cylindrically united end portion having at diametrically opposed portions thereof respective grooves each extending axially from a circular end of said cylindrically united end portion, said method comprising the steps of:

(a) providing diametrically opposed portions of said cylindrical end portion of said tubular pipe with respective slots each extending axially from a circular end of said cylindrical end portion;

(b) inserting said cylindrically united end portion of said breeches pipe into said cylindrical end portion of said tubular pipe in such a manner that said grooves are mated and merged with said slots respectively and by such a degree that an axially leading end of each slot of said tubular pipe is placed in the vicinity of said circular end of said cylindrically united end portion;

(c) welding entirely said circular end of said tubular pipe to an outer surface of the cylindrically united end portion of said breeches pipe in a manner to achieve a hermetic sealing therebetween; and (d) welding entirely a periphery of each slot to that of the corresponding groove in a manner to achieve a hermetic sealing therebetween.

7. A coupling structure comprising:

a breeches pipe having a cylindrically united end portion, said cylindrically united end portion having at diametrically opposed portions thereof respective grooves, each extending axially from a circular end of said cylindrically united end portion;

a tubular pipe having one cylindrical end portion which has at diametrically opposed portions thereof respective slots, each extending axially from a circular end of said cylindrical end portion, said cylindrically united end portion of said breeches pipe being capable of being inserted into the cylindrical end portion of said tubular pipe in such a manner that said grooves are mated and merged with said slots respectively, each slot having an axially leading end in the vicinity of said circular end of said cylindrically united end portion;

a means for welding an innermost periphery of each slot to that of the corresponding groove in a manner to achieve a hermetic sealing therebetween;

and optionally, a second means for welding said circular end of said tubular pipe to an outer surface of the cylindrically united end portion of said breeches pipe to achieve a hermetic sealing therebetween.

* * * * *